(12) United States Patent
Tsai

(10) Patent No.: US 8,936,259 B2
(45) Date of Patent: Jan. 20, 2015

(54) HAND TROLLEY WITH A LOAD TRAY CO-WORKING WITH WHEEL SETS

(71) Applicant: Hai-Ming Tsai, Tainan (TW)

(72) Inventor: Hai-Ming Tsai, Tainan (TW)

( * ) Notice: Subject to any disclaimer, the term of this patent is extended or adjusted under 35 U.S.C. 154(b) by 17 days.

(21) Appl. No.: 13/815,671

(22) Filed: Mar. 15, 2013

(65) Prior Publication Data
US 2014/0265192 A1 Sep. 18, 2014

(30) Foreign Application Priority Data

May 11, 2012 (TW) .............................. 101117021 A
Feb. 6, 2013 (TW) .............................. 102104732 A

(51) Int. Cl.
 B62B 1/02 (2006.01)
 B62B 1/04 (2006.01)
(52) U.S. Cl.
 CPC ..................................... B62B 1/042 (2013.01)
 USPC ........................... 280/47.29; 280/40; 280/652
(58) Field of Classification Search
 USPC ........ 280/47.131, 47.23, 47.24, 47.27, 47.28, 280/47.29, 35, 38, 39, 40, 639, 652, 654, 280/646
 See application file for complete search history.

(56) References Cited

U.S. PATENT DOCUMENTS

| 1,409,838 | A | * | 3/1922 | Emery et al. ...................... 280/40 |
| 3,043,603 | A | * | 7/1962 | Major, Sr. ......................... 280/40 |
| 4,185,853 | A | * | 1/1980 | Thurmond, Jr. ............... 280/652 |
| 4,315,632 | A | * | 2/1982 | Taylor .............................. 280/40 |
| 4,335,895 | A | * | 6/1982 | Walker ....................... 280/47.131 |
| 4,448,434 | A | * | 5/1984 | Anderson ......................... 280/40 |
| 4,917,392 | A | * | 4/1990 | Ambasz ........................... 280/40 |
| 4,969,660 | A | * | 11/1990 | Spak .............................. 280/646 |
| 4,993,727 | A | * | 2/1991 | vom Braucke et al. ......... 280/40 |
| 5,072,958 | A | * | 12/1991 | Young ............................. 280/40 |
| 5,312,006 | A | * | 5/1994 | Lag ................................ 211/195 |
| 5,468,005 | A | * | 11/1995 | Yang ............................... 280/40 |
| 5,630,601 | A | * | 5/1997 | vom Braucke et al. ......... 280/40 |
| 5,803,471 | A | * | 9/1998 | DeMars et al. .................. 280/40 |
| 5,984,327 | A | * | 11/1999 | Hsieh et al. ................. 280/47.24 |
| 6,053,514 | A | * | 4/2000 | Su .................................... 280/40 |
| 6,099,024 | A | * | 8/2000 | Liao .............................. 280/655 |
| RE38,436 | E | * | 2/2004 | Su .................................... 280/40 |
| 7,097,183 | B1 | * | 8/2006 | Su ............................. 280/47.29 |
| 7,140,635 | B2 | * | 11/2006 | Johnson et al. ............... 280/646 |
| 7,387,306 | B2 | * | 6/2008 | Zimmer ..................... 280/47.29 |
| 7,441,785 | B1 | * | 10/2008 | Tsai ........................... 280/47.29 |
| 7,445,231 | B1 | * | 11/2008 | Tsai .............................. 280/655 |
| 8,408,361 | B2 | * | 4/2013 | Chung et al. .................... 182/21 |
| 8,465,029 | B2 | * | 6/2013 | Yang .......................... 280/47.27 |
| 8,602,444 | B2 | * | 12/2013 | Chang et al. ................... 280/652 |
| 2002/0180184 | A1 | * | 12/2002 | Chang ........................... 280/652 |
| 2005/0258621 | A1 | * | 11/2005 | Johnson et al. ............... 280/651 |
| 2008/0197590 | A1 | * | 8/2008 | Tsai .......................... 280/47.18 |
| 2008/0197591 | A1 | * | 8/2008 | Tsai .......................... 280/47.18 |
| 2008/0265547 | A1 | * | 10/2008 | Tsai .............................. 280/646 |
| 2008/0272578 | A1 | * | 11/2008 | Tsai .............................. 280/651 |

(Continued)

*Primary Examiner* — Brodie Follman
(74) *Attorney, Agent, or Firm* — Bacon & Thomas, PLLC

(57) ABSTRACT

A hand trolley with a load tray movably connected with wheel sets includes a handle frame, two wheel sets and a load tray. The handle frame has two pivotal connecting portions used to connect with the wheel sets and the load tray. The wheel sets are provided with an acting surface mutually co-working with an acting surface of the load tray. The wheel sets can be unfolded as the load tray is pushed down, and it can be folded as the load tray is pulled up. Thus the hand trolley is able to make the load tray and the wheel sets folded or unfolded simultaneously, easy to be stowed away.

3 Claims, 5 Drawing Sheets

(56) References Cited

U.S. PATENT DOCUMENTS

| | | | |
|---|---|---|---|
| 2010/0253025 A1* | 10/2010 | Smith | 280/47.27 |
| 2012/0074664 A1* | 3/2012 | Henny et al. | 280/35 |
| 2013/0049333 A1* | 2/2013 | Yang | 280/652 |
| 2013/0147163 A1* | 6/2013 | Chang et al. | 280/652 |

* cited by examiner

HAND TROLLEY WITH A LOAD TRAY CO-WORKING WITH WHEEL SETS

BACKGROUND OF THE INVENTION

1. Field of the Invention

This invention relates to a hand trolley with a load tray co-working with wheel sets, particularly to one able to make the wheel sets concurrently folded or unfolded together with the load tray pulled.

2. Description of the Prior Art

Commonly, a conventional hand trolley is shaped inflexible, with a rather big size making it inconvenient for being stowed up or carried about.

SUMMARY OF THE INVENTION

The object of this invention is to offer a hand trolley with a load tray co-working with wheel sets.

The main characteristics of the invention are a handle frame, two wheel sets and a load tray. The handle frame is provided with a pivotal connecting portion and a pivotal connecting block located at a bottom of its two legs respectively. The pivotal connecting portion is further provided with a fixing ring and an elastic element. The wheel sets are respectively jointed with the pivotal connecting portion of the handle frame, each of the wheel sets provided with a wheel, an acting surface located at one side of the wheel sets, a combining hole and a positioning hole. The load tray is pivotally connected with the pivotal connecting block of the handle frame, provided with an acting body and a pivotal joint groove at two sides respectively.

BRIEF DESCRIPTION OF DRAWINGS

This invention is better understood by referring to the accompanying drawings, wherein.

DETAILED DESCRIPTION OF THE PREFERRED EMBODIMENT

Figure 1:
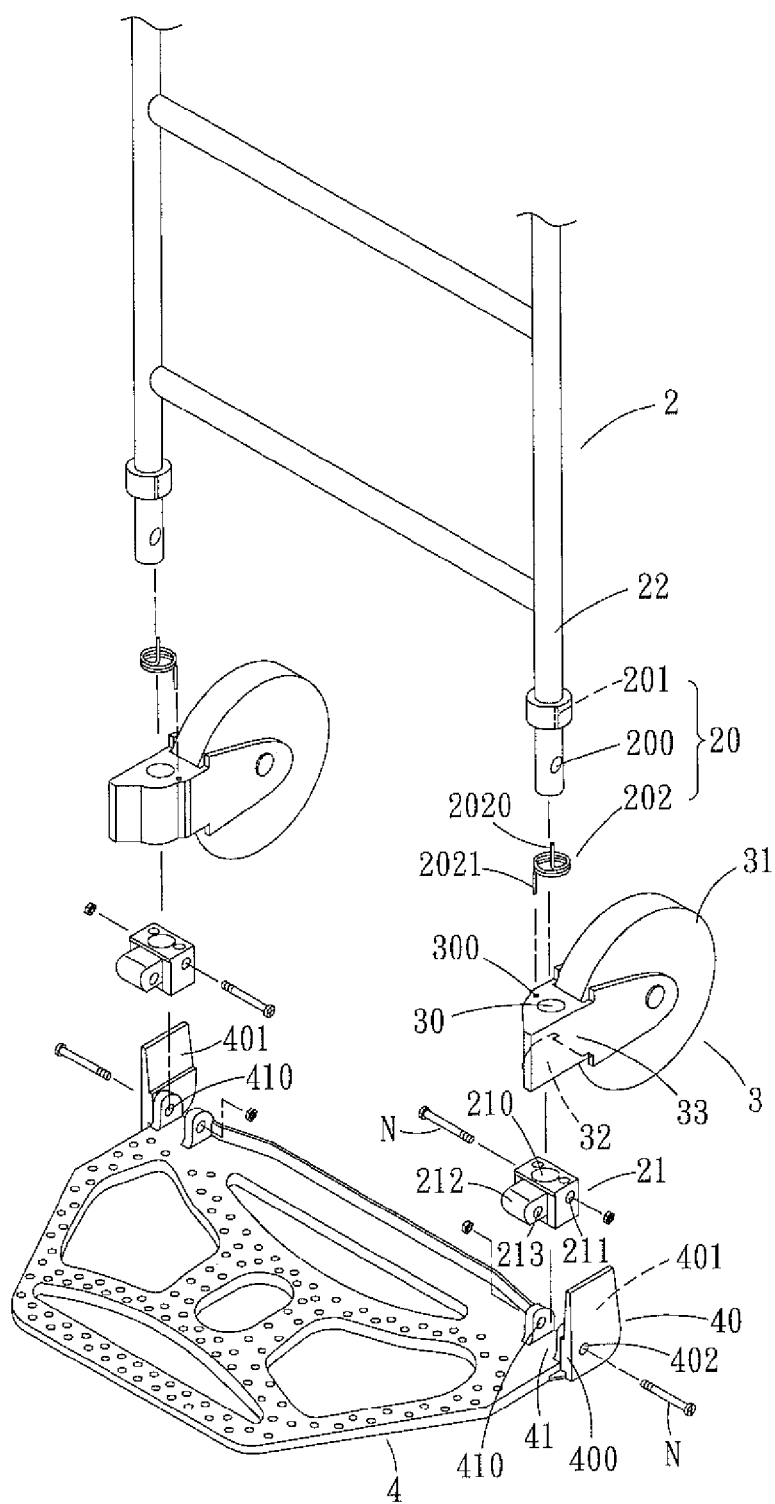
FIG. 1 is an exploded perspective view of a preferred embodiment of a hand trolley with a load tray co-working with wheel sets in the present invention.
Figure 2:
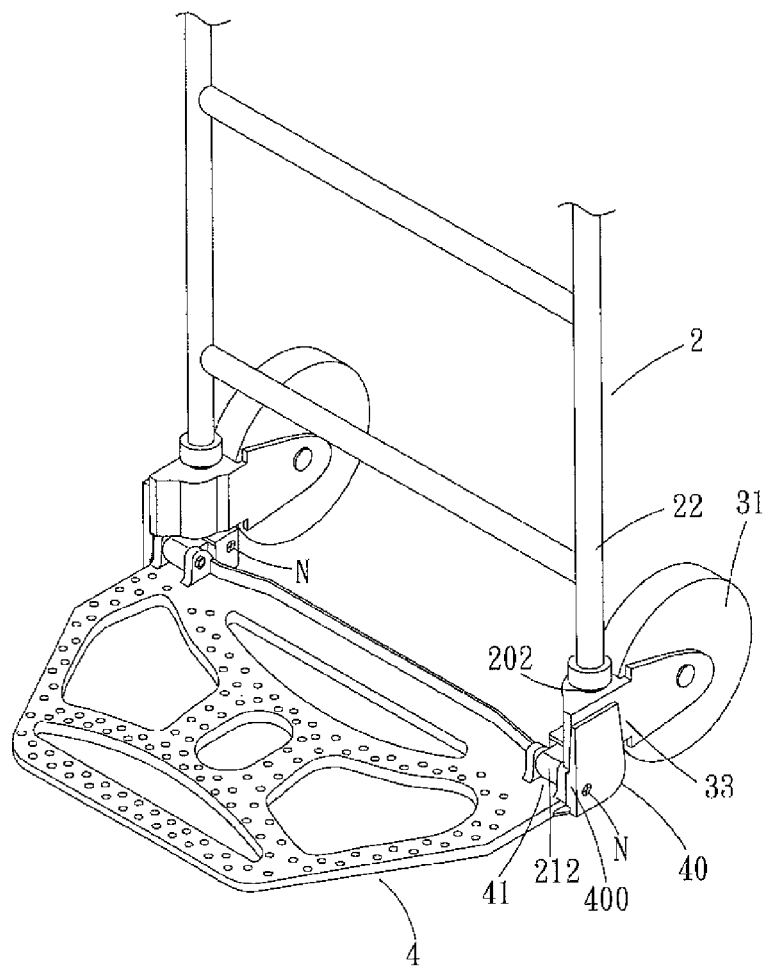
FIG. 2 is a perspective view of the preferred embodiment of a hand trolley with a load tray co-working with wheel sets in the present invention.
Figure 3:
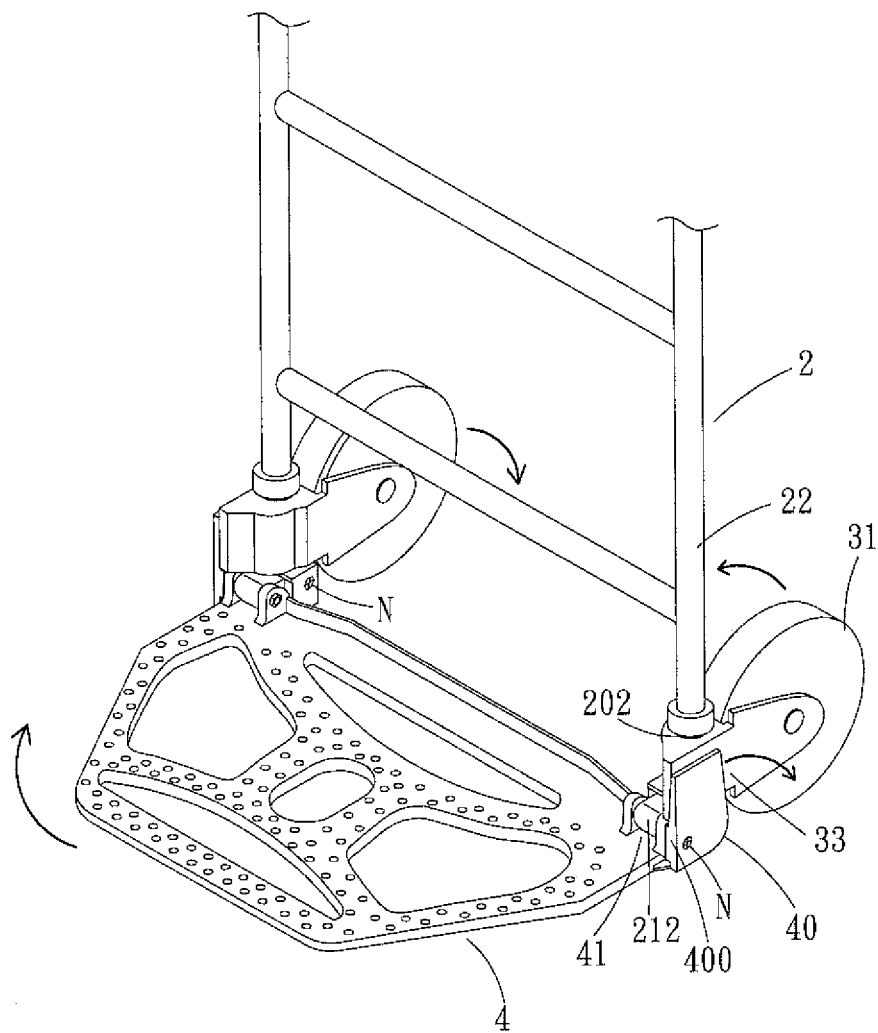
FIG. 3 is a perspective view of the preferred embodiment of a hand trolley with a load tray co-working with wheel sets in the present invention, showing how a load tray and two wheel sets co-work to fold the hand trolley.
Figure 4:
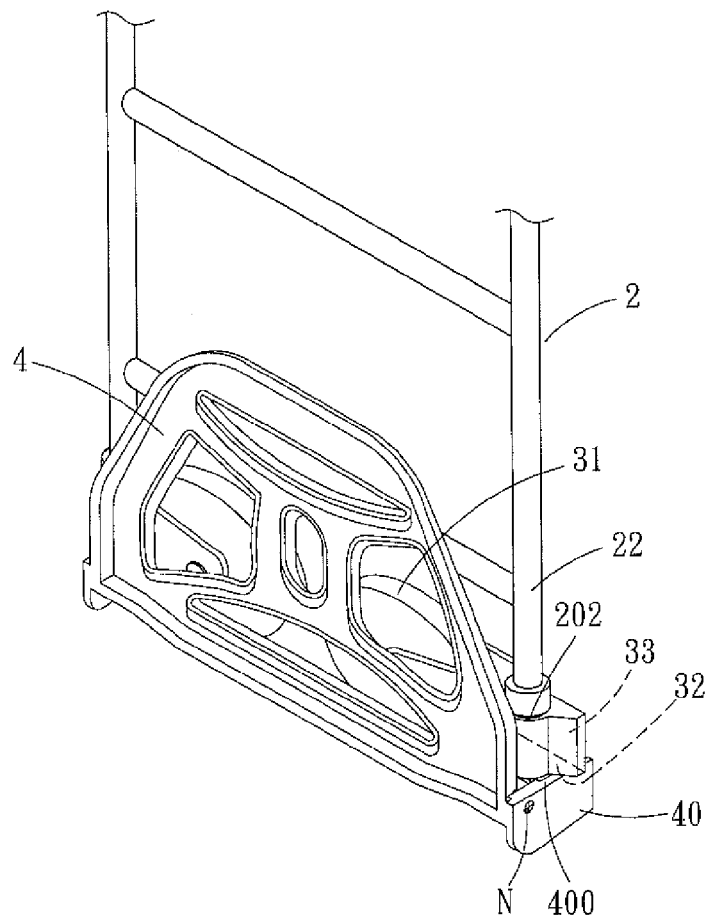
FIG. 4 is a perspective view of the preferred embodiment of a hand trolley with a load tray co-working with wheel sets in the present invention, showing how the load tray and the wheel sets being folded.
Figure 5:
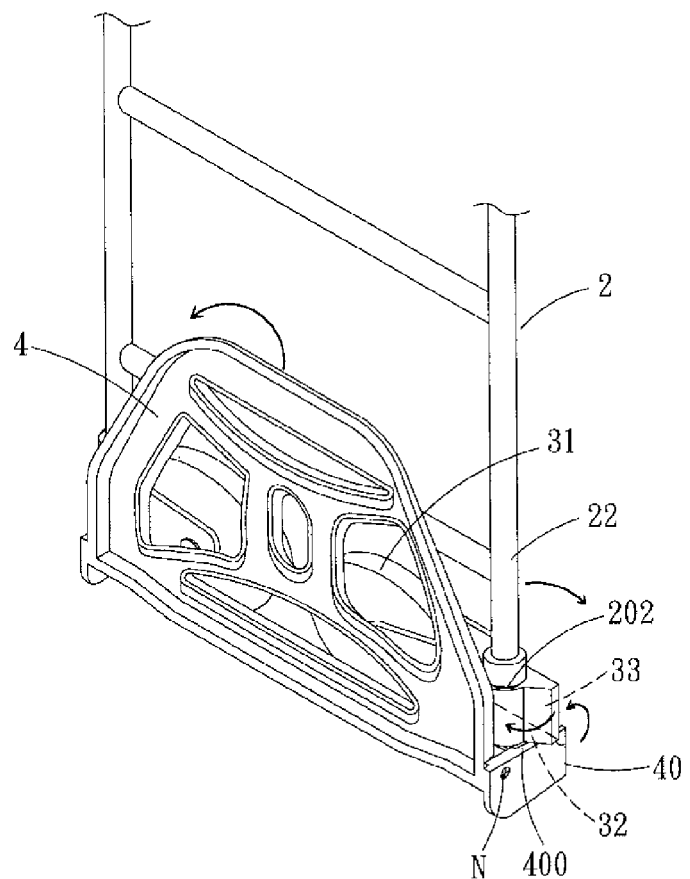
FIG. 5 is a perspective view of the preferred embodiment of a hand trolley with a load tray co-working with wheel sets in the present invention, showing how the load tray and the wheel sets being unfolded.

As shown in FIGS. 1~5, a preferred embodiment of a hand trolley with a load tray co-working with wheel sets in the present invention consists of a handle frame 2, two wheel sets 3 and a load tray 4.

The handle frame 2 is provided with a pivotal connecting portion 20 and a pivotal connecting block 21 located at a bottom of its two legs 22 respectively. The pivotal connecting portion 20 is further provided with a positioning hole 200, a fixing ring 201 and an elastic element 202. The elastic element 202 can be a compression spring, a torsion spring or a hydraulic device, provided with a positioning portion 2020 and an acting member 2021. The pivotal connecting block 21 is shaped like a , connected at the bottom of each of the respective legs 22 of the handle frame 2, provided with a joint hole 210, a fixing hole 211, a pivotal joint portion 212 and a pivotal connecting hole 213.

The wheel sets 3 are respectively jointed with the pivotal connecting portion 20 of the handle frame 2, each of the wheel sets provided with a combining hole 30 bored in the center, a wheel 31, an active surface 32 located at one side of the wheel sets 3 and an acting surface 32 having a contact surface 33. Bored at one side of the combining hole 30 is a positioning hole 300.

The load tray 4 is pivotally connected with the pivotal connecting block 21 of the handle frame 2, provided with an acting body 40 extended upwards from two sides respectively. The acting body 40 is further provided with an acting surface 400, a contact surface 401 and a through hole 402. Cut in the inner side of the acting body 40 is a pivotal joint groove 41, which has two sidewalls respectively bored with a pivotal connecting hole 410. And there are screwing elements N.

In assembling, the positioning portion 2020 of the elastic element 202 is first fitted in the fixing ring 201, and the combining hole 30 of the wheel set 3 is inserted through by the pivotal connecting portion 20, with the acting member 2021 of the elastic element 202 inserted in the positioning hole 300 of the wheel set 3. Next, the joint hole 210 of the pivotal connecting block 21 is fitted with the pivotal connecting portion 20 to attach with the wheel set 3 below, with the screwing element N successively inserted through the fixing hole 211 and the positioning hole 200 of the pivotal connecting portion 20 to make the wheel set 3 combined with the handle frame 2. Then the pivotal joint groove 41 of the load tray 4 is fitted with the pivotal joint portion 212, with the screwing element N successively inserted through the through hole 402, the pivotal connecting hole 410, the pivotal connecting hole 213 and the pivotal connecting hole 410 to make the load tray 4 pivotally combined with the handle frame 2. By the time, the acting surface 32 of the wheel set 3 is crosswise positioned on the acting body 40 of the load tray 4 in a state to restrictively co-work. So the assembly of the present hand trolley is finished.

In using, the load tray 4 is pushed down to enable the acting body 40 to swing upward, concurrently driving the acting surface 32 of the wheel set 3 to swing toward the load tray 4 until the load tray 4 is moved to a preset position, with the contact surfaces 33 and 401 restrictively combined together. By the time, owing to torsion effect originating from the positioning portion 2020 and the acting member 2021 of the elastic element 202, the wheel sets 3 are fixedly positioned, with the wheels 31 swung outward to get ready for operation.

When the present hand trolley is to be folded up, a user only has to pull up the load tray 4, enabling the contact surface 401 of the acting body 40 to move off the contact surface 33 of the wheel set 3. By the time, with torsion of the acting member 2021 of the elastic element 202, the wheel sets 3 are moved toward resting on the handle frame 2. So the present hand trolley can be stowed away without occupying much space.

While the preferred embodiment of the invention has been described above, it will be recognized and understood that various modifications may be made therein and the appended claims are intended to cover all such modifications that may fall within the spirit and scope of the invention.

What is claimed is:

1. A hand trolley with a load tray co-working with wheel sets, said hand trolley comprising:

a handle frame having two legs, said handle frame provided with a pivotal connecting portion and a pivotal connecting block located at a bottom of said two legs respectively, said pivotal connecting portion further provided with a fixing ring and an elastic element;

two wheel sets jointed with said pivotal connecting portion of said handle frame, each of said wheel sets provided with a wheel, an acting surface, and a contact surface located at one side of said wheel set, and a load tray pivotally connected with said pivotal connecting block of said handle frame and provided with an acting body at each of two sides of said load tray, respectively, wherein each said elastic element pushes exerts a torsional force on a respective wheel set to cause said wheel set to pivot in a folding direction, wherein said acting bodies of said load tray and said acting surfaces of said wheel sets engage each other to cause said wheel sets to pivot against said torsional force in response to pivoting of the load tray to a downward position, said contact surfaces of the wheel sets then engaging respective acting bodies to maintain said wheel sets in an unfolded position, and wherein in response to pivoting of the load tray to an upward position, said contact surfaces of the wheel sets disengage from said acting bodies of the load tray, thereby enabling said wheel sets to pivot in said folding direction from said unfolded position to a folded position.

2. The hand trolley with a load tray co-working with wheel sets as claimed in claim 1, wherein each of said wheel sets further includes a combining hole for receiving a respective one of said legs of the handle frame, and a positioning hole, and wherein said elastic element is provided with a positioning portion and an acting member respectively inserted in said fixing ring of said pivotal connecting portion and said positioning hole of said wheel set, so as to create torsion to cause said wheel sets to be folded or unfolded.

3. The hand trolley with a load tray co-working with wheel sets as claimed in claim 1, wherein each said acting surface of each said wheel set is crosswise positioned on a respective acting surface of each said acting body of said load tray so that each said wheel is pushed outward as said load tray is pushed down to make each said wheel set swing outward.

\* \* \* \* \*